United States Patent [19]

Svens

[11] 4,116,737
[45] Sep. 26, 1978

[54] METHOD OF CREATING AN EMBOSSING EFFECT

[76] Inventor: Alvar A. Svens, 112 Main St., Ashburnham, Mass. 01430

[21] Appl. No.: 683,236

[22] Filed: May 4, 1976

Related U.S. Application Data

[63] Continuation of Ser. No. 523,326, Nov. 13, 1974, abandoned.

[51] Int. Cl.² ............................................. B29C 27/00
[52] U.S. Cl. ........................................ 156/85; 101/32; 156/219; 156/277; 156/322; 264/342 R
[58] Field of Search ............ 264/230, 342 R, 342 RE, 264/284, 293; 156/84, 85, 86, 209, 244, 277, 305, 229, 242, 243, 278, 322; 427/257, 262, 267, 274, 280; 101/32, 426

[56] References Cited
U.S. PATENT DOCUMENTS

| | | | |
|---|---|---|---|
| 3,234,313 | 2/1966 | Miller et al. | 264/230 |
| 3,342,654 | 9/1967 | Golonka et al. | 156/85 |
| 3,798,103 | 3/1974 | Gaunt | 156/244 |
| 3,849,158 | 11/1974 | Palmer | 26/69 B |

*Primary Examiner*—David A. Simmons
*Attorney, Agent, or Firm*—Arthur T. Groeninger; Joseph R. Slotnik

[57] ABSTRACT

A method for creating an embossed effect in a desired pattern on a film by printing an agent on said film in said desired pattern to lower the stability of said film in the print areas against heat distortion and laminating said film to a substrate by fusion immediately after the substrate is extruded to cause said print areas to distort and give an embossed appearance as a result of the heat incident to the fusion.

6 Claims, 3 Drawing Figures

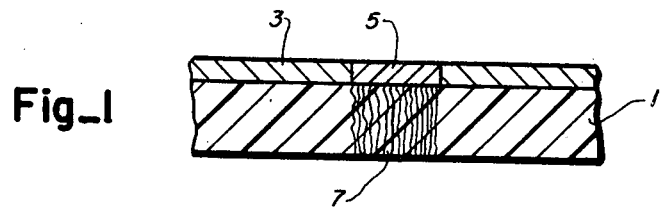
Fig_1
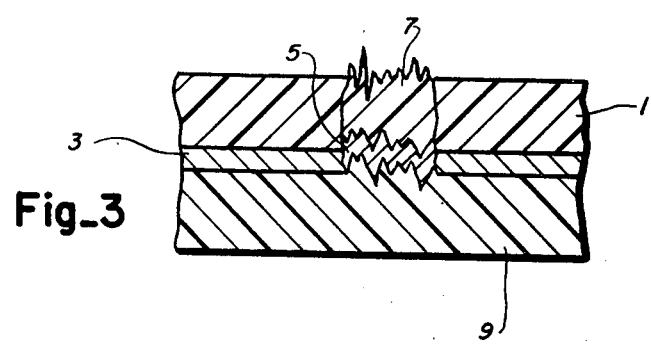
Fig_3
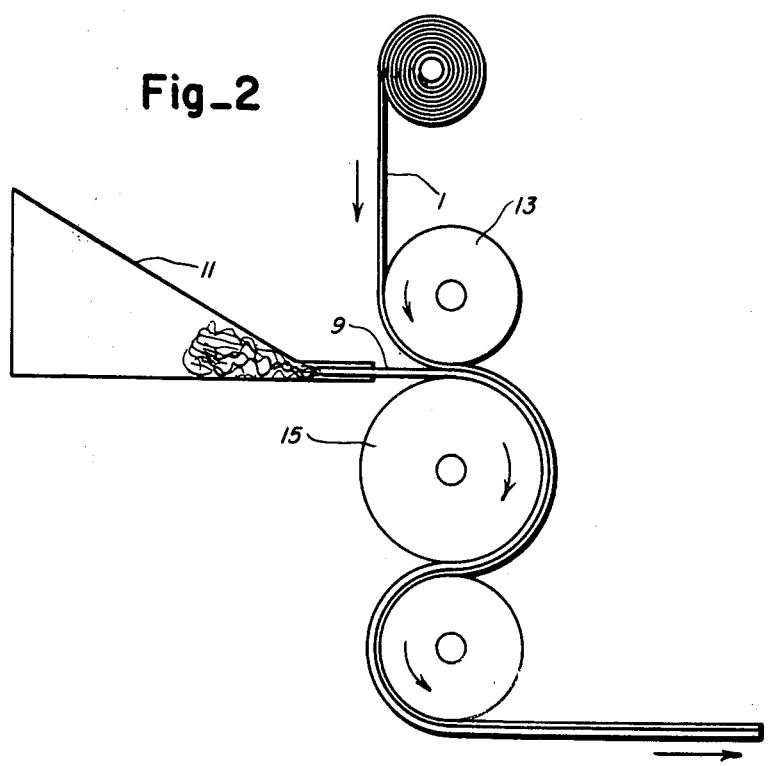
Fig_2

METHOD OF CREATING AN EMBOSSING EFFECT

This is a continuation of application Ser. No. 523,326 filed Nov. 13, 1974, now abandoned.

BACKGROUND OF THE INVENTION

Printed decorative film has found extensive use in surfacing and paneling of walls, appliances, automobiles, etc. Since the surface of the film is planar, heretofore, a three-dimensional effect could not be achieved to provide a realistic appearance to the decorative printed film. While a film can be embossed mechanically, such requires special equipment and processing. In addition, registration of the embossments with the printing is practically impossible with mechanical embossment.

BRIEF SUMMARY OF THE INVENTION

The present invention provides a method for providing an embossmed effect on a film which is in register with the printing. The invention uses conventional printing and laminating techniques normally required in producing film products.

In accordance with the present invention, a film is printed in conventional manner using a number of printing cylinders corresponding to the number of colors required in the printed design. For example, in printing a wood grain, a separate cylinder would be used to print the grain and a separate cylinder would be used to print the tick.

In the wood grain example, it is desirable that the tick of the grain be embossed so as to give a natural wood impression. This is accomplished by incorporation in the ink used to tick an agent which reduces the stability of the film against heat distortion.

After the printing is completed, the film is laminated to a supporting substrate in conventional manner fusing the film to a substrate such as high impact styrene. The lamination takes place immediately after the styrene is extruded. Since the areas printed with the tick readily distort, the finished laminate has an embossed appearance in the area of the tick. Accordingly, a very realistic impression of natural wood is provided.

DRAWINGS

FIG. 1 is a cross section of a film printed in accordance with the present invention with lines shaded to show a portion of the film attacked by one of the inks utilized.

FIG. 2 is a schematic diagram illustrating lamination of the film to a substrate immediately after the latter is extruded.

FIG. 3 is a cross section of the film laminated to a substrate with the film distorted from the heat incident to contact with the substrate during lamination.

DETAILED DESCRIPTION

Referring to FIG. 1, a film 1 is shown having decorative printing thereon. Print 3 corresponds to one color of the decorative printing and print 5 refers to a second color of the decorative printing. The printing technique is conventional, e.g., by use of a multi-station gravure press.

The inks used in forming print 3 is conventional but as hereinafter more particularly described, the inks used for print 5 includes an agent which lowers the resistance of film 1 against heat distortion in the area below the printing as indicated in shaded lines at 7.

After printing, the film 1 is laminated to a supporting substrate 9 as shown schematically in FIG. 2. In accordance with conventional techniques, the substrate 9 is extruded from a hopper 11 and the film 1 is laminated thereto by passage through calendar cylinders 13 and 15. The laminating process is conventional and well known in the art. The film 1 is laminated with print face down as is conventional in the art to provide protection for the print.

The heat of film 1 when placed in contact with the supporting substrate 9 causes area 7 of film 1 to distort as illustrated in the FIG. 3 cross section of the finished product.

The printing ink used in printing print 5 is conventional except that it includes an agent which modifies the heat stability of film 1 so that upon the application of heat, the film 1 wrinkles as illustrated in FIG. 3.

The attack agent selected depends upon the particular film material being used. In the preferred form of the invention, biaxially oriented polystyrene is used as the film and in this instance, a solvent for polystyrene may be used as the attack agent. This agent thus may be selected from any solvent for polystyrene such as toluol, xylol, a ketone, etc.

The amount of solvent employed is not critical. The more solvent used, the greater the effect and thus, the quantity used will depend on result desired and the material being attacked. Obviously, the solvent should evaporate before it destroys the film and this is a matter controlled by machine speed, and drying temperature for the ink, all matters within the control of a skilled gravure press operator.

The film 1 employed can be any film which can have its heat resistance to wrinkle lowered by a solvent or other attacking agent. The preferred film material are biaxially oriented film material which are particularly sensitive to such change by application of a solvent attack agent.

The preferred film material, as hereinbefore described, is biaxially oriented polystyrene. A theoretical explanation for the change in character of the film is not fully understood but is thought that the solvent tends to relax the stressed molecules of the oriented film allowing the film to readily distort upon application of heat. The thickness of film 1 is preferably greater then 0.5 mils. A thinner film would have too great a tendency to rupture. The film can be made of any thickness Any substrate material 9 may be used as long as it is compatible and capable of fusing with the printed film 1. When using a printed biaxially oriented polystyrene film, high impact styrene would suitably serve as a substrate. The substrate 9 should be at a temperature greater than 250° F. when laminated to the biaxially oriented polystyrene. This condition is generally met when the substrate is molten and thus, as hereinbefore described, it is preferred that the lamination take place immediately after the latter is extruded and in a molten state.

EXAMPLE

As an example of the present invention, a 1 ½ mil thick biaxially oriented polystyrene film was printed by a multi station gravure press. The inks employed were conventional inks for printing on polystyrene except that at one station toluol was added to the ink with 3 parts of toluol being added to 10 parts of ink. Conventional press procedure was followed.

The printed film was then laminated with printing face down to high impact styrene as the latter emerged from the orifice of an extruder. The laminated assembly was passed through calendar cylinders to fuse the printed film to the styrene substrate. As the laminate emerged from the calendar cylinders, the area printed with the toluol solvent were distorted giving a textured, three dimensional effect.

While a preferred embodiment of the invention has been described, it is to be understood that variations which would occur to a skilled chemist in the art may be made within the scope of the invention.

What is claimed is:

1. A method of creating an embossed effect in a desired pattern on a film, said film being constructed of a material which can have its heat resistance to wrinkle lowered by application of an attacking agent thereto, comprising the steps of impregnating selected areas of said film with said attacking agent thereby lowering the heat resistance to wrinkle of said selected film areas, laminating said film to a substrate heated to a temperature greater then 250° F., said heated substrate causing said selected areas of said film to wrinkle and distort, and thereby creating an embossed effect on said film.

2. A method as defined by claim 1, wherein said film is biaxially oriented.

3. A method as defined by claim 1, wherein said film is biaxially oriented polystyrene.

4. a method as defined by claim 3, wherein said attacking agent comprises a solvent for said film.

5. A method as defined in claim 1 wherein said attacking agent is incorporated in an ink imprinted on said film.

6. A method as defined in claim 1 wherein said substrate is extruded and in a molten state during lamination of said film thereto and is at a temperature greater then 300° F.

* * * * *